(12) United States Patent
Ryu et al.

(10) Patent No.: US 10,468,023 B2
(45) Date of Patent: Nov. 5, 2019

(54) ELECTRONIC APPARATUS AND CONTROL METHOD THEREOF

(71) Applicant: SAMSUNG ELECTRONICS CO., LTD., Suwon-si (KR)

(72) Inventors: Young-jun Ryu, Suwon-si (KR); Dong-Wan Kim, Seoul (KR); Jae-hyun Bae, Suwon-si (KR); Ki-hoon Shin, Yongin-si (KR); Nam-gook Cho, Suwon-si (KR); Byeong-seob Ko, Suwon-si (KR); Ki-beom Kim, Yongin-si (KR); Hee-seob Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/667,747

(22) Filed: Aug. 3, 2017

(65) Prior Publication Data

US 2017/0330568 A1  Nov. 16, 2017

Related U.S. Application Data

(63) Continuation of application No. 14/571,440, filed on Dec. 16, 2014, now Pat. No. 9,830,907.

(30) Foreign Application Priority Data

Dec. 23, 2013 (KR) ........................ 10-2013-0161138

(51) Int. Cl.
*G10L 17/22* (2013.01)
*G10L 15/22* (2006.01)
(Continued)

(52) U.S. Cl.
CPC ............ *G10L 15/22* (2013.01); *G06F 1/3215* (2013.01); *G06F 1/3265* (2013.01); *G06F 3/167* (2013.01);
(Continued)

(58) Field of Classification Search
CPC ... G10L 15/22; G10L 2015/088; G10L 15/32; G10L 2015/223; G10L 15/02;
(Continued)

(56) References Cited

U.S. PATENT DOCUMENTS 5,774,859 A  6/1998 Houser et al.
6,070,140 A  5/2000 Tran
(Continued)

FOREIGN PATENT DOCUMENTS

CA  2 319 997 A1  10/2001
CN  103021411 A  4/2013
(Continued)

OTHER PUBLICATIONS

Communication dated May 9, 2017 issued by the European Patent Office in counterpart European Application No. 14874861.9.
(Continued)

*Primary Examiner* — Edwin S Leland, III
(74) *Attorney, Agent, or Firm* — Sughrue Mion, PLLC

(57) ABSTRACT

Disclosed are a display apparatus and a method of controlling the display apparatus. The display apparatus includes: a signal receiver configured to receive a broadcasting signal; a display configured to display an image based on the received broadcasting signal; a sound receiver configured to receive a sound spoken by a user; a first sound recognizer configured to be supplied with power when the display apparatus is in a standby mode, and determine whether the received sound is a reserved word candidate having a high probability of corresponding to a reserved word; a second sound recognizer configured to be supplied with power when the received sound is determined as the reserved word candidate and to determine whether the received sound is the reserved word; and a controller configured to control the
(Continued)

US 10,468,023 B2

Page 2 preset operation to be performed when the received sound is determined as the reserved word.

14 Claims, 9 Drawing Sheets

(51) Int. Cl.
| | | |
|---|---|---|
| *H04N 5/63* | (2006.01) | |
| *G06F 3/16* | (2006.01) | |
| *H04N 5/60* | (2006.01) | |
| *H04N 21/422* | (2011.01) | |
| *G06F 1/3215* | (2019.01) | |
| *G06F 1/3234* | (2019.01) | |
| *G10L 15/08* | (2006.01) | |
| *G10L 15/02* | (2006.01) | |
| *G10L 15/32* | (2013.01) | |
| *H04N 5/44* | (2011.01) | |
| *H04N 21/443* | (2011.01) | |

(52) U.S. Cl.
CPC .............. *H04N 5/60* (2013.01); *H04N 5/63* (2013.01); *H04N 21/42203* (2013.01); *G10L 15/02* (2013.01); *G10L 15/32* (2013.01); *G10L 2015/088* (2013.01); *G10L 2015/223* (2013.01); *H04N 21/4436* (2013.01); *H04N 2005/4428* (2013.01); *H04N 2005/4432* (2013.01)

(58) Field of Classification Search
CPC ...... G06F 1/3215; G06F 1/3265; G06F 3/167; H04N 5/60; H04N 21/42203; H04N 5/63; H04N 21/4436; H04N 2005/4432; H04N 2005/4428
USPC ......................................................... 704/231
See application file for complete search history.

(56) References Cited

U.S. PATENT DOCUMENTS

| | | | |
|---|---|---|---|
| 6,369,643 B1 | 4/2002 | Lee et al. | |
| 7,418,392 B1 | 8/2008 | Mozer et al. | |
| 7,454,635 B2 | 11/2008 | Ito et al. | |
| 8,258,922 B2 | 9/2012 | Shu et al. | |
| 8,452,597 B2 | 5/2013 | Bringert et al. | |
| 8,860,890 B2 | 10/2014 | Jang et al. | |
| 9,542,933 B2* | 1/2017 | Mortensen | G10L 15/02 |
| 2001/0020276 A1 | 9/2001 | Kim et al. | |
| 2002/0021372 A1 | 2/2002 | Konda et al. | |
| 2003/0216909 A1 | 11/2003 | Davis et al. | |
| 2004/0128137 A1 | 7/2004 | Bush et al. | |
| 2005/0057552 A1 | 3/2005 | Foo et al. | |
| 2005/0094036 A1 | 5/2005 | Tichelaar | |
| 2006/0156047 A1 | 7/2006 | Ito et al. | |
| 2007/0260358 A1 | 11/2007 | Katoh | |
| 2007/0288597 A1 | 12/2007 | Chang et al. | |
| 2008/0229132 A1 | 9/2008 | Suga et al. | |
| 2009/0112605 A1* | 4/2009 | Gupta | B60R 16/0373 704/275 |
| 2011/0058206 A1 | 3/2011 | Park et al. | |
| 2011/0134251 A1 | 6/2011 | Kim et al. | |
| 2011/0138416 A1 | 6/2011 | Kang et al. | |
| 2011/0163602 A1 | 7/2011 | Joo et al. | |
| 2011/0249291 A1 | 10/2011 | Tsuzuki et al. | |
| 2011/0320886 A1 | 12/2011 | Suzuki et al. | |
| 2012/0137156 A1 | 5/2012 | Huang et al. | |
| 2013/0169525 A1* | 7/2013 | Han | G10L 15/22 345/156 |
| 2013/0246071 A1* | 9/2013 | Lee | H04W 52/0254 704/275 |
| 2014/0136215 A1* | 5/2014 | Dai | G10L 15/22 704/275 |
| 2014/0149122 A1 | 5/2014 | Zhang | |
| 2014/0201639 A1* | 7/2014 | Savolainen | G10L 17/26 715/727 |
| 2015/0106085 A1 | 4/2015 | Lindahl | |
| 2015/0179176 A1* | 6/2015 | Ryu | G06F 3/167 704/275 |
| 2016/0217795 A1* | 7/2016 | Lee | G10L 15/32 |

FOREIGN PATENT DOCUMENTS

| | | |
|---|---|---|
| CN | 103310785 A | 9/2013 |
| EP | 1 341 380 A1 | 9/2003 |
| EP | 1 504 440 A2 | 11/2003 |
| EP | 2610862 A1 | 7/2013 |
| JP | 10312194 A | 11/1998 |
| JP | 2000315120 A | 11/2000 |
| JP | 2001-308970 A | 11/2001 |
| JP | 2004-289710 A | 10/2004 |
| JP | 2005-267099 A | 9/2005 |
| JP | 2006262495 A | 9/2006 |
| JP | 2011-223387 A | 11/2011 |
| JP | 2011219106 A | 11/2011 |
| RU | 2004125803 A | 2/2006 |
| WO | 99/17590 A1 | 4/1999 |
| WO | 03/073755 A1 | 9/2003 |
| WO | 2011/075531 A2 | 6/2011 |
| WO | 2012025784 A1 | 3/2012 |

OTHER PUBLICATIONS

Communication dated May 9, 2017, issued by the Japanese Patent Office in counterpart Japanese Application No. 2013-219106.
Communication dated Sep. 5, 2017, issued by the Japanese Patent Office in counterpart Japanese Patent Application No. 2013-219106.
Communication dated Sep. 28, 2017, issued by the Federal Service for Intellectual Property in counterpart Russian Patent Application No. 2015116522.
Communication dated Mar. 24, 2017, issued by the United States Patent and Trademark Office in counterpart U.S. Appl. No. 14/571,440.
"Minimizing Power Consumption in Micro-Processor Based Systems which Utilize Speech Recognition Devices", Technical Disclosure Bulletin, vol. 37, No. 10, Oct. 1994, pp. 151-153.
Communication dated Apr. 24, 2015 issued by the European Patent Office in counterpart Application No. 13 189 365.3.
Communication dated Dec. 10, 2013 issued by the International Searching Authority in counterpart Application No. PCT/KR2013/006900.
Communication dated Jul. 7, 2015, issued by the Unite States Patent and Trademark Office in counterpart U.S. Appl. No. 14/481,240.
Communication dated Mar. 11, 2014 issued by the European Patent Office in counterpart European Application No. 13189365.3.
Communication dated Mar. 27, 2015 issued in counterpart International Application No. PCT/KR2014/012249 (PCT/ISA/210).
Communication dated Nov. 18, 2015 issued by the European Patent Office in counterpart European Patent Application No. 13189365.3.
Non-Final OA dated Dec. 20, 2013 issued by the USPTO in counterpart U.S. Appl. No. 13/955,701.
Non-Final Office Action dated Nov. 7, 2014 issued by the USPTO in counterpart U.S. Appl. No. 14/481,240.
Notice of Allowance dated Jun. 9, 2014 issued by the USPTO in counterpart U.S. Appl. No. 13/955,701.
Notice of Allowance dated Feb. 27, 2015 issued in counterpart U.S. Appl. No. 14/481,240.
Supplemental Notice of Allowance dated Aug. 14, 2014 issued by the USPTO in counterpart U.S. Appl. No. 13/955,701.
Communication dated Dec. 12, 2017, issued by the European Patent Office in counterpart European Application No. 17155722.6.
Casey Johnston., "Hands-on: gesture, voice, and the many inputs of Samsung's smart TV", arstechnica.com, Mar. 7, 2012, XP055350878, Total 7 pages, Retrieved from the Internet: URL:https://arstechnica.com/gadgets/2012/03/hands-on-gesture-voice-and-the-many-inputs-of-samsungs-smart-tv/.
David Katzmaier., "Samsung Smart Interaction: Hands-on with voice and gesture control-CNET", cnet.com, Apr. 9, 2012, XP

(56) References Cited

OTHER PUBLICATIONS

055350885, Total 6 pages, Retrieved from the Internet: URL:https://www.cnet.com/news/samsung-smart-interaction-hands-on-with-voice-and-gesture-control/.
Communication dated Apr. 4, 2018 issued by the State Intellectual Property Office of P.R. China in counterpart Chinese Patent Application No. 201480070712.9.
Communication dated Jun. 4, 2018 issued by the European Patent Office in counterpart European Patent Application No. 14874861.9.
Communication dated Nov. 30, 2018, issued by the European Patent Office in counterpart European Application No. 17155722.6.
Communication dated Dec. 25, 2018, issued by the Chinese Patent Office in counterpart Chinese Application No. 201480070712.9.
Communication dated Jun. 26, 2019, issued by the Korean Intellectual Property Office in corresponding Korean Application No. 10-2012-0121659.

* cited by examiner

ELECTRONIC APPARATUS AND CONTROL METHOD THEREOF

CROSS-REFERENCE TO RELATED APPLICATION

This application is a Continuation of U.S. patent application Ser. No. 14/571,440, filed Dec. 16, 2014, which claims priority from Korean Patent Application No. 10-2013-0161138, filed on Dec. 23, 2013 in the Korean Intellectual Property Office, the disclosure of which is incorporated herein by reference in its entirety.

BACKGROUND

Field

Apparatuses and methods consistent with the exemplary embodiments relate to an electronic apparatus and a control method thereof, and more particularly to an electronic apparatus, which receives a user's voice and operates in accordance with the received sound, and a control method thereof.

Description of the Related Art

In an electronic apparatus such as a television (TV) or the like display apparatus a game console, a navigation system for a vehicle, etc., control based on a user's voice has been growing. For example, a function of turning on the electronic apparatus in response to a sound spoken by a user in the state that the electronic apparatus is turned off (hereinafter, referred to as a 'standby mode') may be one of the applicable examples of controlling the electric apparatus with a user's voice.

FIG. 1 shows one of the examples where the electronic apparatus related to an exemplary embodiment performs an operation in accordance with a user's voice in the standby mode. First, the electronic apparatus receives a sound in the standby mode (11). The sound received by the electronic apparatus may be a user's voice, or a different sound from the user's voice. In particular, the user's voice includes a command (hereinafter, referred to as a 'reserved word') for instructing the electronic apparatus to perform a preset operation corresponding to the sound. Next, the electronic apparatus recognizes a possible reserved word (12). If the received sound is, in fact, the reserved word (13), the electronic apparatus performs an operation corresponding to the reserved word (14). For example, if the reserved word is a reserved word for "power-on," the electronic apparatus is woken up from the standby mode and is turned on.

However, a sound recognizer 15 needs to be turned on in the standby mode and be ready at any time to receive a sound and for operation, so that the electronic apparatus can receive a sound in the standby mode and recognize the reserved word. The sound recognizer 15 may for example be implemented as a microprocessor or the like. Therefore, the sound recognizer 15 unavoidably consumes power in the standby mode in order to remain active and ready for operation. On the other hand, there has been an increased demand for configuring the electronic apparatus so as to consume as little electric power as possible in the standby mode. Accordingly, there is a need of minimizing the power consumption of the sound recognizer 15 operating in the standby mode.

Meanwhile, as a result of improvements to the hardware or software of the sound recognizer 15, there is a corresponding increase in the reliability of the sound recognizer 15 in recognizing the reserved word 13. However, an improvement to the hardware or software of the sound recognizer 15 causes a corresponding increase in cost of implementing the improvement. Also, the power consumption is increased as a result of an increase in performance of the hardware or software of the sound recognizer 15. Accordingly, the sound recognizer 15 needs to be more efficiently designed in order to increase the reliability of the sound recognizer 15, while at the same time, keeping in mind the costs of power consumption.

SUMMARY

One or more exemplary embodiments may provide an electronic apparatus, which can operate in response to a user's voice while consuming the minimum amount of power in a standby mode or a power saving mode, and a control method thereof.

The power saving mode may be coincident with the standby mode and includes any mode in which the electronic apparatus consumes less power than that of when the electronic apparatus is in a normal mode. Hereinafter, features of an exemplary embodiment with respect to the standby mode may also be applied to another exemplary embodiment with respect to the power saving mode.

The electronic apparatus may consume less power where at least one component of the electronic apparatus is turned off and is not supplied with power. Alternatively, the electronic apparatus may consume less power where at least one component of the electronic apparatus performs fewer operations than those in the normal mode. Alternatively, the electronic apparatus may consume less power where at least one component of the electronic apparatus performs an operation at a lower degree than that in the normal mode. The component of electronic apparatus may be a hardware component or a software component.

Also, another exemplary embodiment may provide an electronic apparatus, which can recognize a user's voice with a high reliability and perform an operation while minimizing costs or power consumption, and a control method thereof.

According to an exemplary embodiment, there is provided a display apparatus including: a signal receiver configured to receive a broadcasting signal; a display configured to display an image based on the received broadcasting signal; a sound receiver configured to receive a sound spoken by a user; a first sound recognizer configured to be supplied with electric power when the display apparatus is in a standby mode, and further configured to determine whether the sound received by the sound receiver in the standby mode is a reserved word candidate having a high probability of corresponding to a reserved word for instructing the display apparatus to perform a preset operation; a second sound recognizer configured so as not to be supplied with electric power in the standby mode, and configured to be supplied with the electric power when the received sound is determined as the reserved word candidate and to determine whether the received sound is the reserved word; and a controller configured to control the preset operation to be performed when the received sound is determined as the reserved word.

The first sound recognizer may determine whether the received sound is the reserved word candidate, based on an energy characteristic including a level of the received sound.

The first sound recognizer may determine whether the received sound is the reserved word candidate, based on a human sound characteristic including at least one from among a zero-crossing rate, a spectral flatness value and a speech presence probability.

The first sound recognizer may determine whether the received sound is the reserved word candidate, based on a similarity with the reserved word.

The first sound recognizer may determine whether the received sound is the reserved word candidate, based on at least one selected from among an energy characteristic, a human sound characteristic and a similarity with the reserved word in accordance with current conditions.

At least one of the signal receiver and the display corresponding to the determined reserved word may be not supplied with electric power in the standby mode, and be supplied with the electric power when the received sound is determined as the reserved word.

The reserved word may include a first reserved word and a second reserved word, and the first sound recognizer may determine whether the received sound is a reserved word candidate corresponding to the first reserved word in the standby mode, and determine whether the received sound is a reserved word candidate corresponding to the second reserved word when the display apparatus is in a normal mode.

A number of commands corresponding to the second reserved word may be larger than a number of commands corresponding to the first reserved word.

According to an exemplary embodiment, there is provided a method of controlling a display apparatus for displaying an image based on a received broadcasting signal, the method comprising: receiving a sound spoken by a user; with a first sound recognizer, which is supplied with electric power when the display apparatus is in a standby mode, determining whether the sound received in the standby mode is a reserved word candidate having a high probability of corresponding to a reserved word for instructing the display apparatus to perform a preset operation; with a second sound recognizer, which is not supplied with electric power in the standby mode and is supplied with the electric power when the received sound is determined as the reserved word candidate, determining whether the received sound is the reserved word; and performing the preset operation when the received sound is determined as the reserved word.

The determining whether the received sound is the reserved word candidate may include determining whether the received sound is the reserved word candidate, based on an energy characteristic including a level of the received sound.

The determining whether the received sound is the reserved word candidate may include determining whether the received sound is the reserved word candidate, based on a human sound characteristic including at least one from among a zero-crossing rate, a spectral flatness value, and a speech presence probability.

The determining whether the received sound is the reserved word candidate may include determining whether the received sound is the reserved word candidate, based on a similarity with the reserved word.

The determining whether the received sound is the reserved word candidate may include determining whether the received sound is the reserved word candidate, based on at least one selected from among an energy characteristic, a human sound characteristic, and a similarity with the reserved word in accordance with current conditions.

The method may further include: supplying no electric power to an operation performer that performs an operation corresponding to the reserved word in the standby mode, and supplying the electric power to the operation performer when the received sound is determined as the reserved word.

The reserved word may include a first reserved word and a second reserved word, and the determining whether the received sound is the reserved word candidate may include: determining whether the received sound is a reserved word candidate corresponding to the first reserved word in the standby mode; and determining whether the received sound is a reserved word candidate corresponding to the second reserved word when the display apparatus is in a normal mode.

A number of commands corresponding to the second reserved word may be larger than a number of commands corresponding to the first reserved word.

According to an exemplary embodiment, there is provided a display apparatus including: a signal receiver configured to receive a signal; a display that displays an image based on the signal; a sound receiver, configured to detect a sound; a first sound recognizer configured to be provided with electric power when the display apparatus is in a standby mode.

The first sound recognizer is configured to determine whether the sound received by the sound receiver when the display apparatus is in a standby mode is a reserved word candidate having a high probability of corresponding to a reserved word for instructing an element of an operational performer to perform a first preset operation.

There is provided a second sound recognizer configured so as not to be provided with electric power while the display apparatus is the standby mode, wherein the second sound recognizer is configured to be supplied with electric power when the received sound is determined as the reserved word candidate and to determine whether a received sound is the reserved word.

There is provided a controller configured to control a second preset operation to be performed when the received sound is determined as the reserved word.

According to an exemplary embodiment, there is provided a method of controlling a display apparatus for displaying an image based on a received broadcasting signal, the method comprising: receiving a sound spoken by a user with a first sound recognizer, the first sound recognizer not provided with electric power when the display apparatus is in a standby mode. Determining whether the received sound is a reserved word candidate having a high probability of similarity to a reserved word; instructing an element of an operational performer to perform a first preset operation if the reserved word candidate has a high probability of similarity to the reserved word. Receiving the sound with a second sound recognizer, the second sound recognizer provided with electric power when the received sound is determined as the reserved word candidate. Determining whether the received sound is the reserved word, and performing a second preset operation when the received sound is determined as the reserved word.

According to an exemplary embodiment, there is provided an apparatus comprising: a signal receiver configured to receive a broadcasting signal; a sound receiver configured to detect a received sound spoken by a user; a first sound recognizer configured to be supplied with electric power when the apparatus is in a standby mode, and determine whether the sound received by the sound receiver while in the standby mode is a reserved word candidate having a high probability of corresponding to a reserved word for instructing the apparatus to perform a preset operation.

There is provided a second sound recognizer configured so as not to be supplied with electric power in the standby mode, and to be supplied with electric power when the received sound is determined as the reserved word candidate and to determine whether the received sound is the reserved word; and a controller configured to control the preset operation to be performed when the received sound is determined as the reserved word.

According to an exemplary embodiment, there is provided a method of controlling an apparatus, the method comprising: receiving a sound spoken by a user with a first sound recognizer, the first sound recognizer not provided with electric power when the apparatus is in a standby mode; determining whether the received sound is a reserved word candidate having a high probability of similarity to a reserved word; instructing an element of an operation performer to perform a first preset operation if the reserved word candidate has a high probability of similarity to the reserved word; receiving the sound with a second sound recognizer, the second sound recognizer provided with electric power when the received sound is determined as the reserved word candidate; determining whether the received sound is the reserved word; performing a second preset operation when the received sound is determined as the reserved word.

According to an exemplary embodiment, there is provided a display apparatus comprising a signal receiver configured to receive a signal; a display that displays an image based on the signal; a sound receiver configured to display a sound; a first sound recognizer configured to be provided with electric power when the display apparatus is in a standby mode, wherein the first sound recognizer is configured to determine whether the sound received by the sound receiver is a reserved word candidate having a high probability of corresponding to a reserved word for instructing an element of an operational performer to perform a preset operation.

There is provided a second sound recognizer configured so as not to be provided with electric power while the display apparatus is the standby mode, wherein the second sound recognizer is configured to be supplied with electric power when the received sound is determined as the reserved word candidate and to determine whether a received sound is the reserved word.

If the current operation mode corresponds to a first operation mode, the first sound recognizer determines whether the received sound is a reserved word candidate corresponding to a first reserved word; wherein if the current operation mode does not correspond to the first operation mode, the display apparatus determines whether the current operation mode corresponds to a second operation mode.

If the current operation mode corresponds to a second operation mode, the first sound recognizer determines whether the received sound is the reserved word candidate corresponding to a second reserved word; wherein a number of commands corresponding to the second reserved word may be greater than a number of commands corresponding to the first reserved word; and a controller configured to control the preset operation to be performed when the received sound is determined as the reserved word.

According to an exemplary embodiment, there is provided a method of controlling a display apparatus, the method comprising: receiving a sound spoken by a user with a first sound recognizer, the first sound recognizer not provided with electric power when the apparatus is in a standby mode. Determining whether the current operation mode corresponds to a first operation mode, and determining whether the received sound is a reserved word candidate corresponding to a first reserved word. Instructing an element of an operation performer to perform a first preset operation if the reserved word candidate has a high probability of similarity to the first reserved word. Receiving the sound with a second sound recognizer, the second sound recognizer provided with electric power when the received sound is determined as the reserved word candidate. Determining whether the current operation mode does not correspond to the first operation mode, and further determining whether the current operation mode corresponds to a second operation mode. Instructing the first sound recognizer to determine whether the received sound is the reserved word candidate corresponding to a second reserved word, and performing a preset operation when the received sound is determined as the first or second reserved word.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
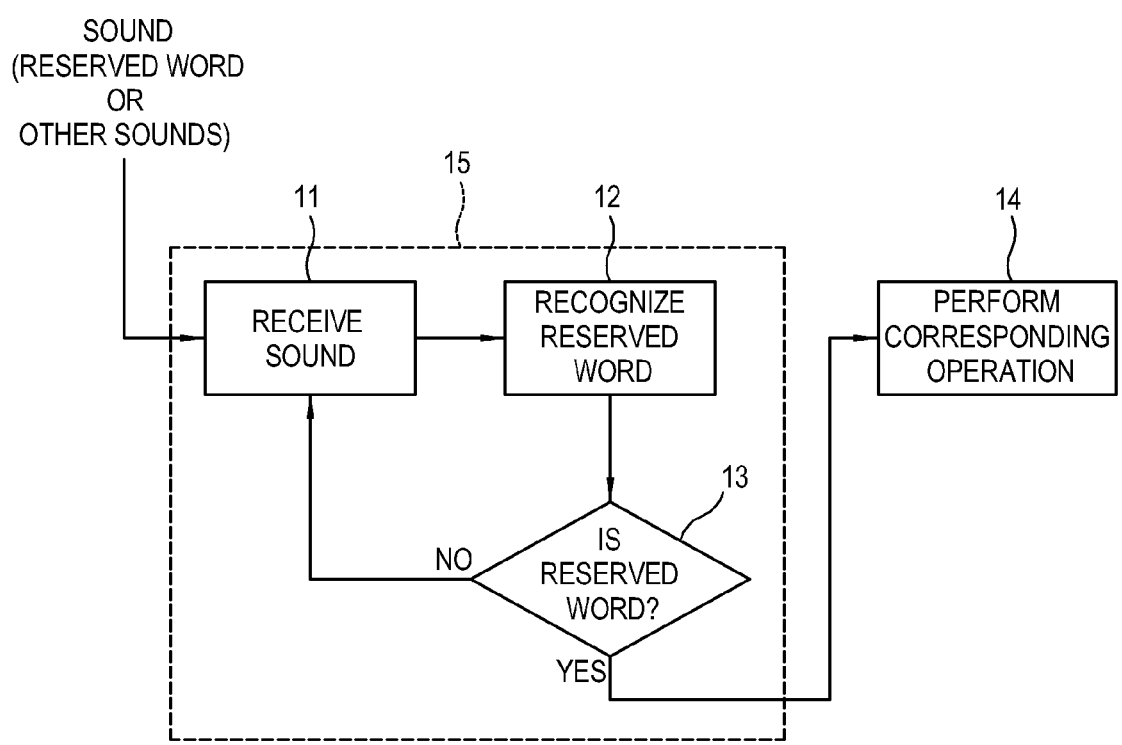
FIG. 1 shows an example where an electronic apparatus related to an exemplary embodiment while in a standby mode performs an operation in response to a user's voice.
Figure 2:
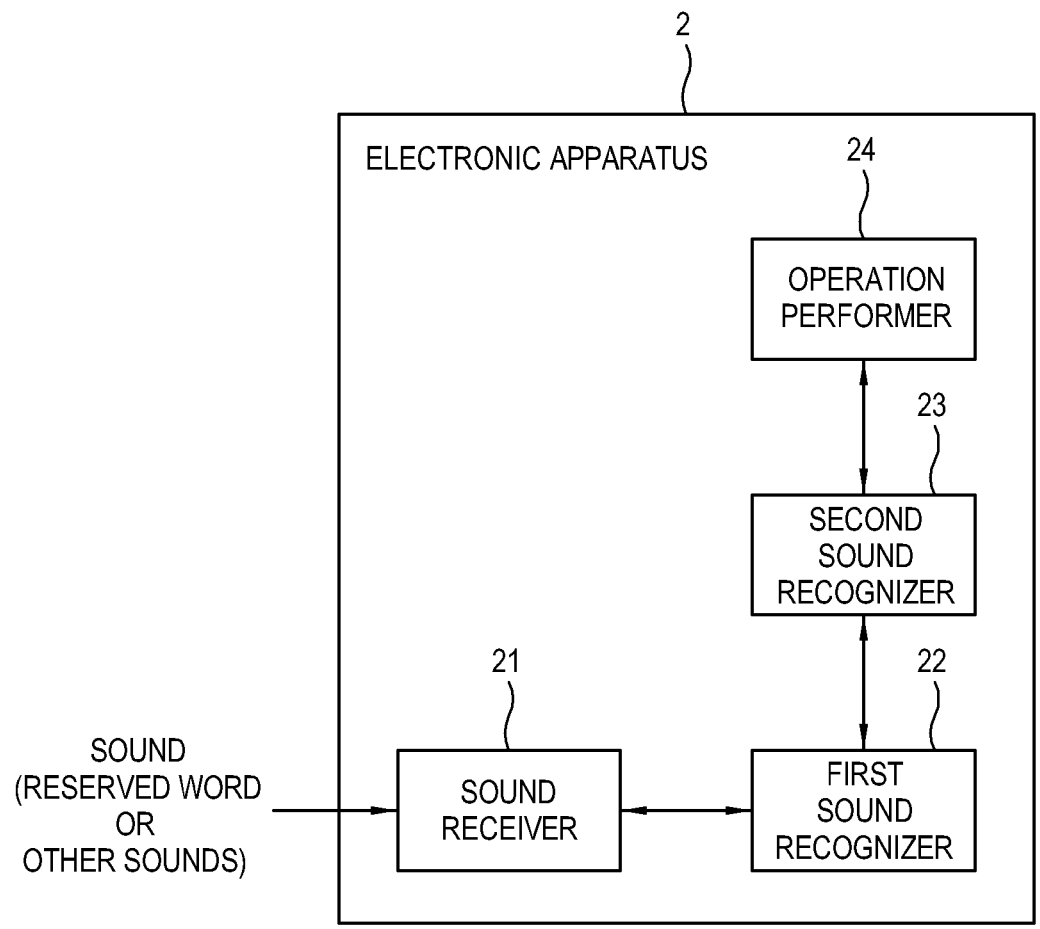
FIG. 2 is a block diagram of an electronic apparatus according to an exemplary embodiment.

Below, exemplary embodiments will be described in detail. FIG. 2 is a block diagram of an electronic apparatus 2 according to an exemplary embodiment. As shown in FIG. 2, the electronic apparatus 2 may be implemented as a display apparatus such as a television (TV), a game console, a navigation system for a vehicle, etc., and may include any device which performs an operation by recognizing a sound. Referring to FIG. 2, the electronic apparatus 2 includes a sound receiver 21, a first sound recognizer 22, a second sound recognizer 23 and an operation performer 24.

Figure 3:
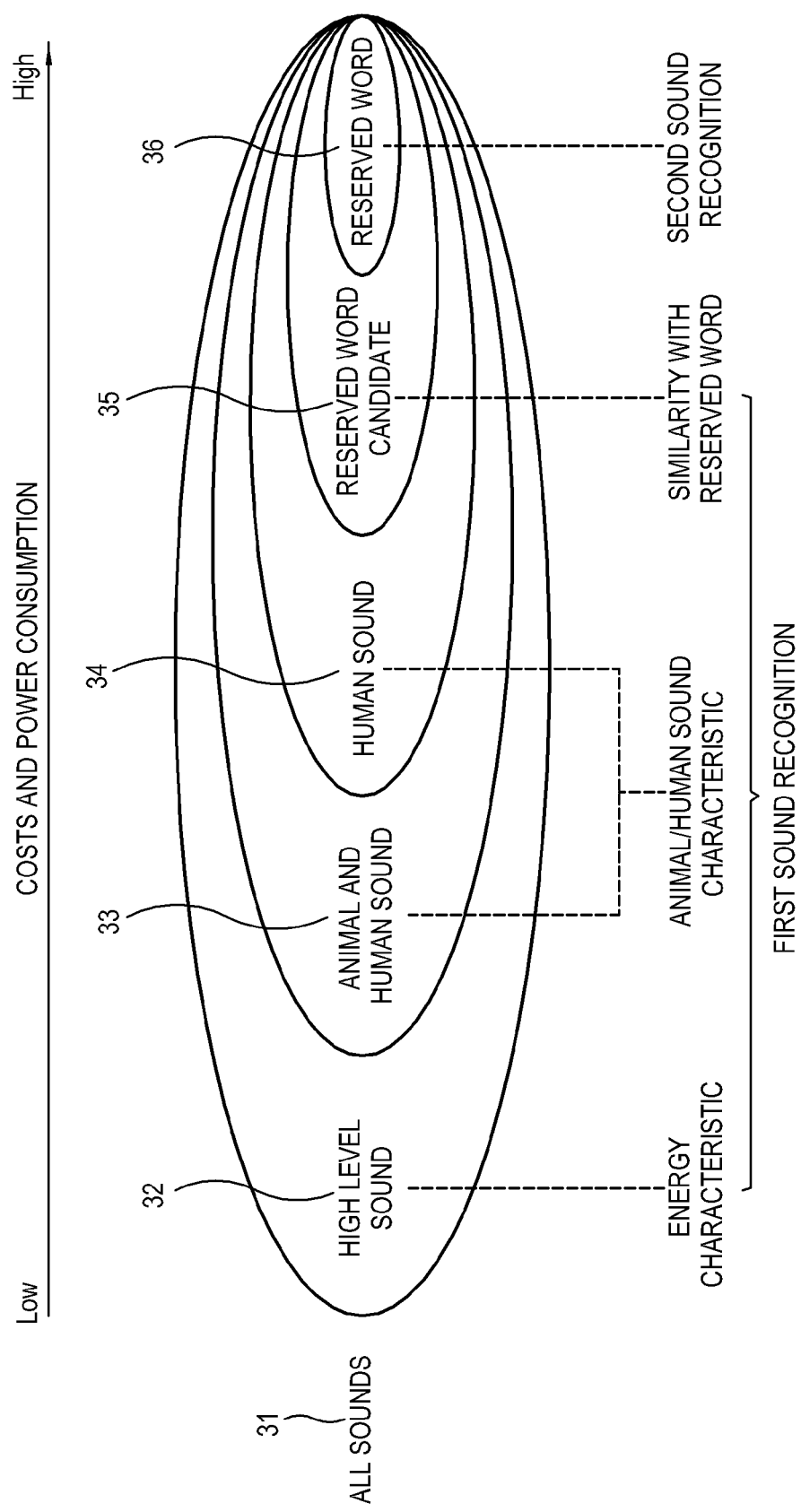
FIG. 3 shows the kind of sounds received by a sound receiver in the electronic apparatus according to an exemplary embodiment.

First, the sound receiver 21 receives a sound. The sound receiver 21 may be implemented as a microphone. The sound received by the sound receiver 21 may include a user's voice, and a sound that is not the user's voice. FIG. 3 shows the kind of sounds that may be received by the sound receiver 21. First, all the sounds 31 received by the sound receiver 21 include noise or the like, and a high level sound 32 having a corresponding low cost and power consumption. The high level sound 32 may include, for example, an animal and a human sound 33, although the high level sound 32 also includes noise. A human sound 34 may further include a sound 35 having a high probability of corresponding to a preset reserved word (hereinafter, referred to as a 'reserved word candidate'). The reserved word candidate 35 includes a preset reserved word 36. In FIG. 3, the cost and power consumed in the sound recognition operation increases moving from left to right along the horizontal axis.

Referring back to FIG. 2, each of the first sound recognizer 22 and the second sound recognizer 23 performs sound recognition with respect to the sound received by the sound receiver 21. The first sound recognizer 22 performs sound recognition as a pre-process for the operation of the second sound recognizer 23, that is, the first sound recognizer 23 performs sound recognition before the second sound recognizer 23 (hereinafter, referred to as 'first sound recognition'). The second sound recognizer 23 performs sound recognition as a post-process for the operation of the first sound recognizer 22, that is the second sound recognizer 23 performs a sound recognition after the first sound recognition (hereinafter, referred to as 'second sound recognition'). That is, the first sound recognition of the first sound recognizer 22 may comprise a basic or general recognition, and the second sound recognition of the second sound recognizer 23 may comprise a more detailed or in-depth recognition. Specifically, the first sound recognizer 22 determines whether the sound received by the sound receiver 21 is the reserved word candidate 35 corresponding to the preset reserved word 36. On the other hand, the second sound recognizer 23 determines whether the sound received by the sound receiver 21 is the preset reserved word 36.

Referring to FIG. 2, the operation performer 24 performs an operation corresponding to the reserved word 36. The operation performer 24 may perform one or more various operations corresponding to the use or function of the electronic apparatus 2. For example, if the electronic apparatus 2 is the display apparatus such as a TV, the operation performer 24 may perform operations of processing an image signal and displaying an image based on the processed image signal. The operation performer 24 may be achieved by hardware, software, or a combination thereof, and may be provided simultaneously.

Figure 4:
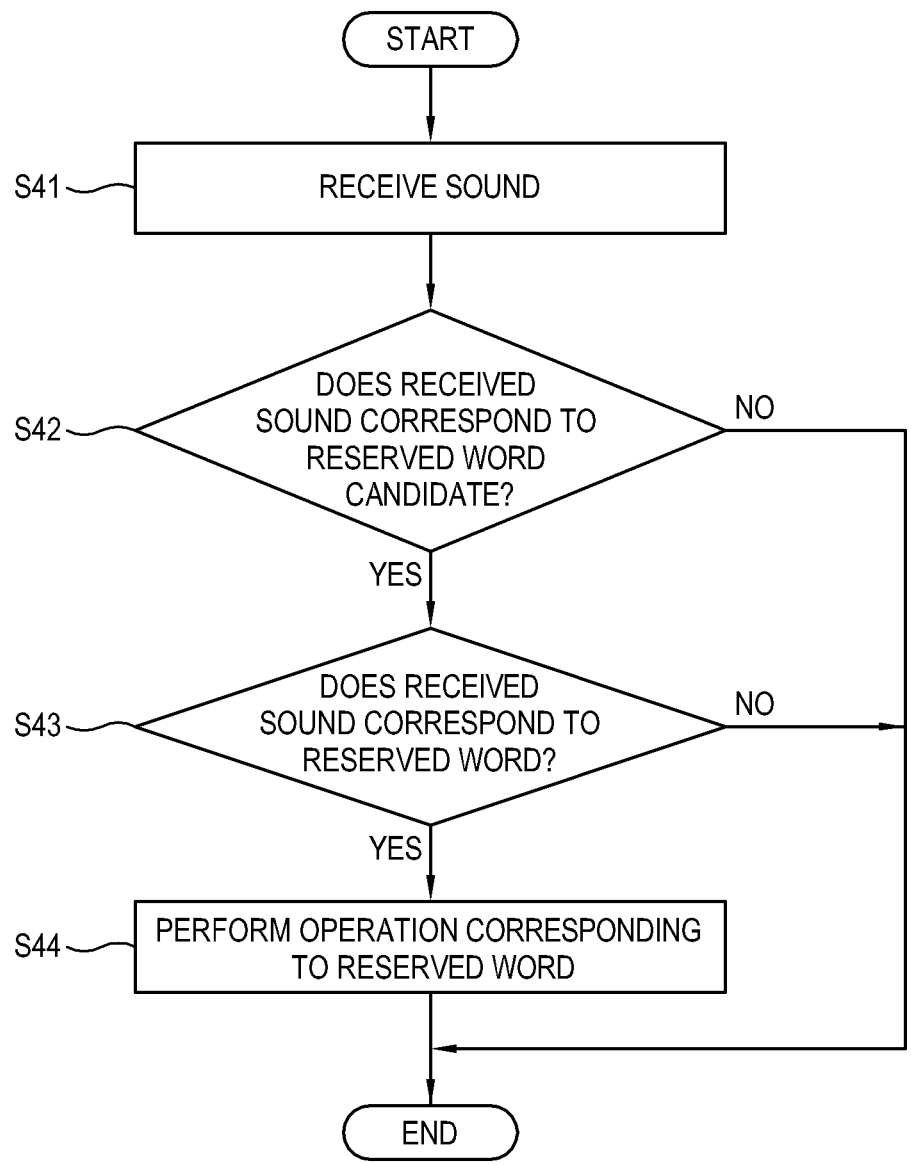
FIG. 4 is a flowchart showing the operation of the electronic apparatus according to an exemplary embodiment.

FIG. 4 is a flowchart showing operations of the electronic apparatus 2 according to an exemplary embodiment. At operation S41, the electronic apparatus 2 receives a sound. Next, at operation S42, the electronic apparatus 2 determines whether the received sound in operation S41 is a preset reserved word candidate 35. If it is determined that the received sound is not the preset reserved word candidate 35 ("No" of S42), the electronic apparatus 2 stops the operation. If it is determined that the received sound from operation S41 is the preset reserved word candidate 35 ("Yes" of S42), at operation S43, the electronic apparatus 2 determines whether the received sound is the preset reserved word 36. If it is determined that the received sound is not the preset reserved word ("No" of S43), the electronic apparatus 2 stops the operation. If it is determined that the received sound is the preset reserved word ("Yes" of S43), at operation S44 the electronic apparatus 2 performs an operation corresponding to the determined reserved word 36.

Thus, according to an exemplary embodiment, the recognition of the received sound is divided into the first sound recognition as the pre-process, and the second sound recognition as the post-process. That is, the first sound recognition operation for the basic and general recognition, filters out beforehand a sound having a low probability of corresponding to the reserved word 36 from the received sounds, and the more detailed and in-depth second sound recognition operation is performed with regard to only a sound corresponding to the reserved word candidate 35 having a high probability of corresponding to the reserved word. Thus, it is possible to share functionality of the first sound recognition and the second sound recognition, and it is also possible to have efficient and optimized design in consideration of each characteristic of the first sound recognition and the second sound recognition. Further, a sound having a low probability of corresponding to the reserved word 36 is filtered out by determining beforehand whether it is the reserved word candidate 35 having a higher probability of corresponding to the reserved word 36 before determining whether it is the reserved word, thereby improving a recognition success rate with respect to the reserved word 36. Thus, as compared with a situation in which the hardware or software performance of the limited single sound recognizer is increased in order to improve the reliability of sound recognition, the electronic apparatus 2 according to an exemplary embodiment can perform the sound recognition with higher reliability and lower costs.

Referring back to FIG. 2, the first sound recognizer 22 determines whether the sound received in the sound receiver 21 corresponds to the reserved word candidate 35, based on at least one from among an energy characteristic, a sound characteristic, and a similarity with a reserved word 36. For example, the first sound recognizer 22 may determine the sound 32 having a high level from all the received sounds 31, based on an energy characteristic of the sound. Also, the first sound recognizer 22 may distinguish the animal sound 33 and the human sound 34 from among all the sounds 31 or the sounds 32 having a high level, based on animal and human sound characteristics. Also, the first sound recognizer 22 may determine the reserved word candidate 35 from all the sounds 31, the high level sound 32, the animal and human sound 33 or the human sound 34, based on a similarity with the preset reserved word 36.

The first sound recognizer 22 may detect the energy characteristic or sound characteristic of the corresponding sound by determining sections of the received sound. The first sound recognizer 22 may determine the energy characteristic or sound characteristic of the corresponding sound with respect to a time or frequency domain of a sound. The first sound recognizer 22 may detect the energy characteristic of the corresponding sound with respect to a certain energy level condition of the received sound. The first sound recognizer 22 may determine the energy characteristic of the corresponding sound by using a certain level (dB) of the received sound as a critical point. Also, the first sound recognizer 22 may determine the energy characteristic, based on a relative ratio between the level of the received sound and a level of a reference sound. Further, the first sound recognizer 22 may determine the energy characteristic, based on a maintenance time for the determination section of the received sound.

The first sound recognizer 22 may determine an animal or human sound characteristic, based on a zero-crossing rate of the received sound. The first sound recognizer 22 may determine the zero-crossing rate of the received sound, based on the number of +/− crossing times with respect to an average silent section level. Also, the first sound recognizer 22 may determine a characteristic of the received sound, based on a gradient of an input signal distribution in the frequency domain, that is, based on a spectral flatness value. Further, the first sound recognizer 22 may determine the characteristic of the received sound, based on a probabilistic model about speech/noise, that is, based on a speech presence probability.

The first sound recognizer 22 may determine whether the received sound is the reserved word candidate 35, based on similarity with a preset reserved word 36. The first sound recognizer 22 may determine the similarity with the reserved word corresponding to some commands selected among a plurality of commands for controlling the electronic apparatus 2. The first sound recognizer 22 may determine the similarity with the reserved word, based on a classification or a model lighter than the second sound recognition of the second sound recognizer 23.

Figure 5:
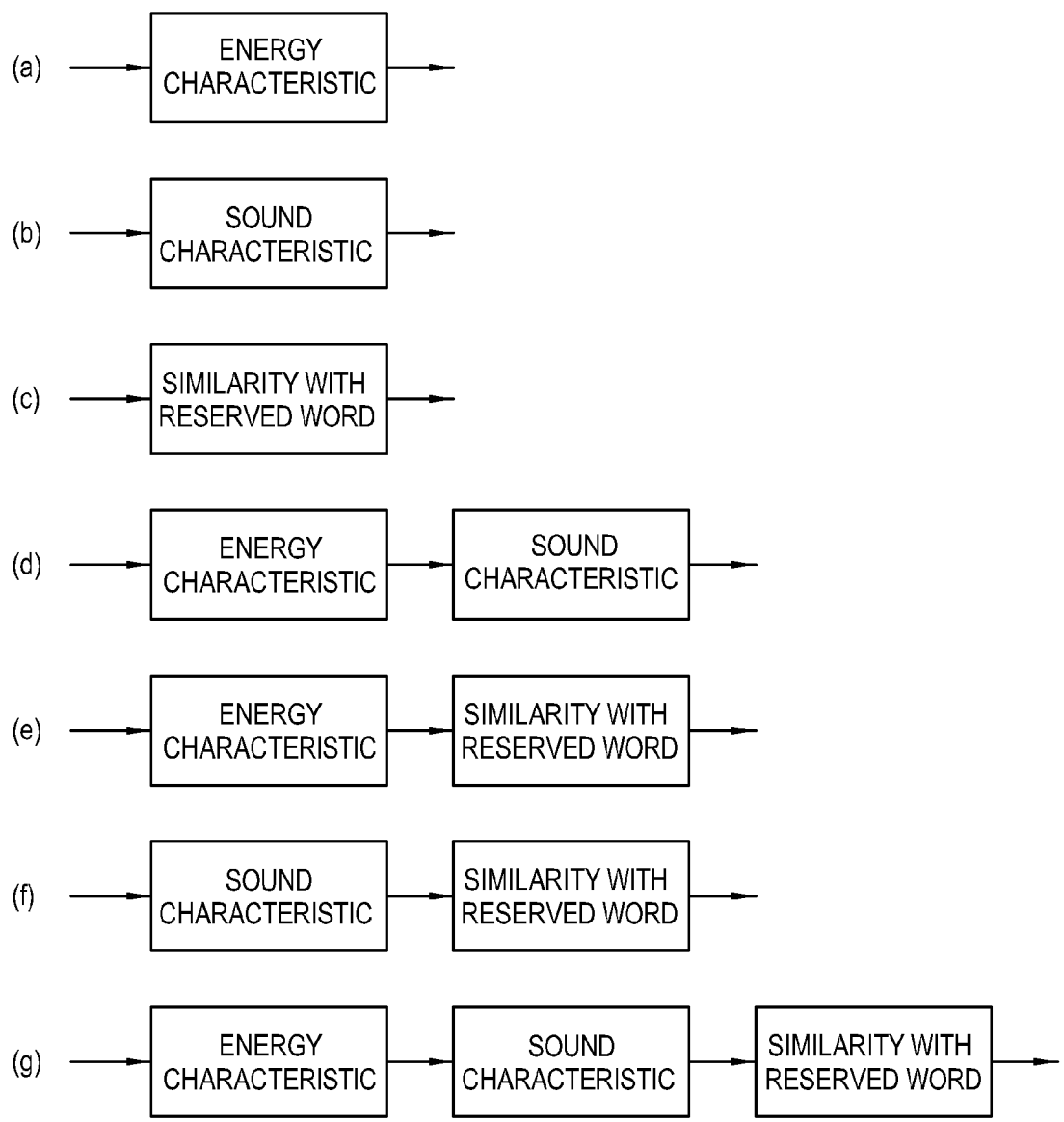
FIG. 5 is a block diagram showing the operation of a first sound recognizer in the electronic apparatus according to an exemplary embodiment.

The first sound recognizer 22 may determine whether the received sound is the reserved word candidate 35, based on at least one selected from among an energy characteristic, a human sound characteristic and similarity with the reserved word, in accordance with current conditions. FIG. 5 is a block diagram showing operations of a first sound recognizer 22 in the electronic apparatus according to an exemplary embodiment. As shown in FIG. 5, the first sound recognizer 22 may determine whether the received sound is the reserved word candidate 35, based on only one from among the energy characteristic, the human sound characteristic and the similarity with the reserved word (refer to (a), (b) and (c) of FIG. 5). Also, the first sound recognizer 22 may determine whether the received sound is the reserved word candidate 35, based on sequential combination between two selected from among the energy characteristic, the human sound characteristic and the similarity with the reserved word 36 (refer to (d), (e) and (f) of FIG. 5). Further, the first sound recognizer 22 may determine whether the received sound is the reserved word candidate 35, based on sequential combination of all of the energy characteristic, the human sound characteristic and the similarity with the reserved word (refer to (g) of FIG. 5).

Figure 6:
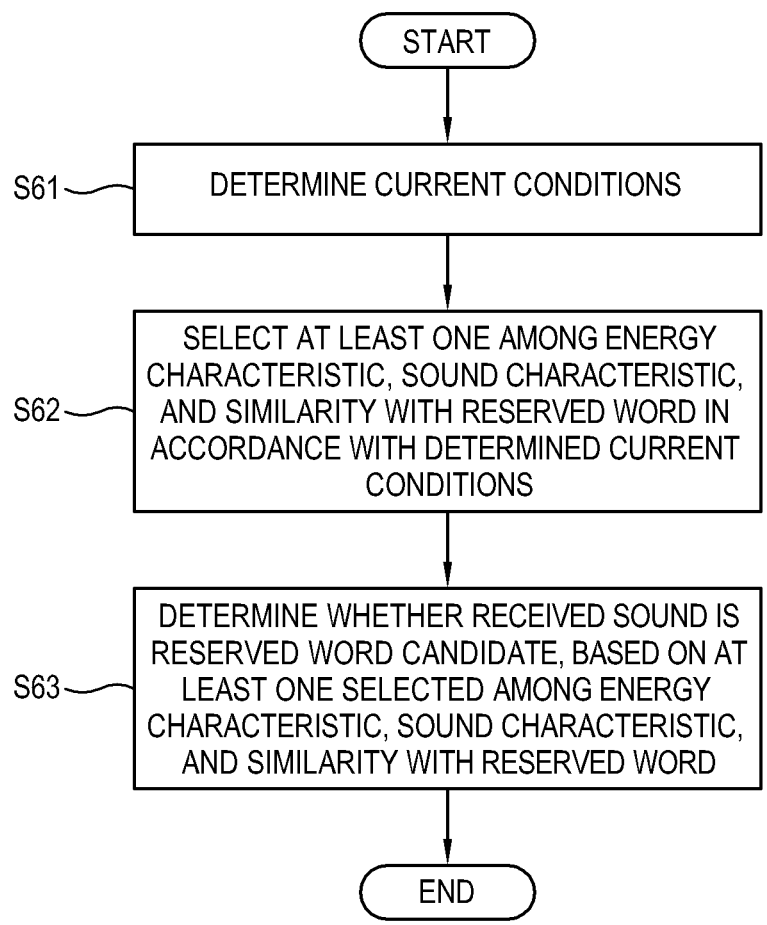
FIG. 6 is a flowchart showing another example of the operation of the electronic apparatus according to an exemplary embodiment.

In the case of the energy characteristic, computational complexity of an algorithm is low, but reliability is also relatively low. On the other hand, in the case of the sound characteristic, the computational complexity of the algorithm and the reliability are higher than those of the energy characteristic. In the case of the similarity with the reserved word 36, the computational complexity of the algorithm and the reliability are the highest as compared with those of the energy characteristic and the sound characteristic, but relatively more power is consumed. It may be determined which is selected from among the energy characteristic, the human sound characteristic and the similarity with the reserved word, in accordance with the state of the electronic apparatus 2, ambient environments, a user's request, etc. by taking the respective conditions of the energy characteristic, the human sound characteristic and the similarity with the reserved word into account. FIG. 6 is a flowchart showing another example of operations of the electronic apparatus according to an exemplary embodiment. At operation S61, the electronic apparatus 2 determines the current conditions. At operation S62, in accordance with the determined current conditions, the electronic apparatus 2 may select at least one corresponding to the current condition, from among the energy characteristic, the human sound characteristic and the similarity with the reserved word 36. The electronic apparatus 2 collects information showing the current condition from at least one sensor, for example, a microphone, a camera, an operation sensor, a pressure sensor, a temperature sensor, or an external device, and selects at least one corresponding to the current condition from among the energy characteristic, the human sound characteristic and the similarity with the reserved word 36, based on the collected information. Next, at operation S63, the first sound recognizer 22 of the electronic apparatus 2 may determine whether the received sound is the reserved word candidate 35, based on at least one selected from among the energy characteristic, the human sound characteristic and the similarity with the reserved word 36.

If the electronic apparatus 2 enters the standby mode, the first sound recognizer 22 is being supplied with electric power at a normal mode, but the second sound recognizer 23 and the operation performer 24 are in the power saving mode and is not supplied with electric power. The first sound recognizer 22 normally operates in the standby mode, and determines whether the received sound is the reserved word candidate 35. The second sound recognizer 23 is in the power saving mode, and is then switched from the power saving mode into the normal mode to be supplied with the electric power if the first sound recognizer 22 determines that the received sound is the reserved word candidate 35, thereby performing the second sound recognition operation. Alternatively, the second sound recognizer 23 may be in the power saving mode to be supplied with the electric power but consume less power than a predetermined level.

Therefore, if the electronic apparatus 2 is in the standby mode, the second sound recognizer 23 is in the power saving mode while the first sound recognizer 22 performs the first sound recognition operation, thereby minimizing the power consumption of the electronic apparatus 2 even while performing the sound recognition in the standby mode. Meanwhile, the operation performer 24 is woken up from the power saving mode to the normal mode when the second sound recognizer 23 determines that the received sound is the reserved word, thereby performing the operation corresponding to the reserved word. Accordingly, in the standby mode or the like mode, the electronic apparatus 2 consumes less power even while performing the sound recognition operation.

At least one of the first sound recognizer 22 and the second sound recognizer 23 may be implemented as a hardware component such as an integrated circuit or a software component such as a computer program. The first sound recognizer 22 and the second sound recognizer 23 may be implemented in a single body or in separate bodies, respectively. The second sound recognizer 23 may be turned off and not supplied with power in the power saving mode. Alternatively, the second sound recognizer 23 may not operate consuming little power in the power saving mode. Alternatively, the second sound recognizer 23 may perform fewer operations in the power saving mode than those in the normal mode. Alternatively, the second sound recognizer 23 may perform an operation at a lower degree in the power saving mode than that in the normal mode.

Figure 7:
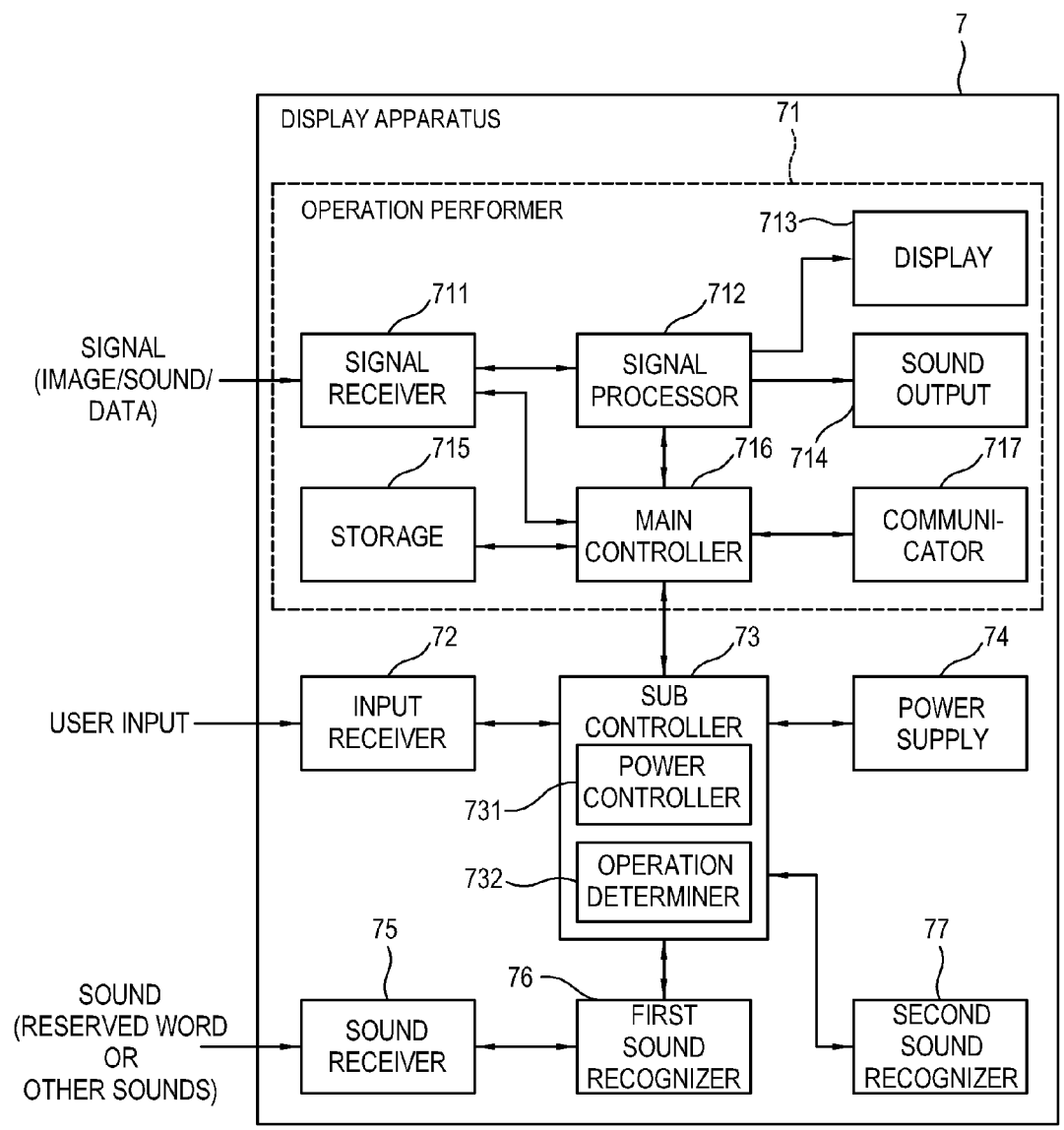
FIG. 7 is a block diagram of a display apparatus according to an exemplary embodiment.

According to an exemplary embodiment, the electronic apparatus 2 may be achieved by a display apparatus such as a TV. FIG. 7 is a block diagram of a display apparatus according to an exemplary embodiment. The display apparatus 7 may include a sound receiver 75, a first sound recognizer 76, a second sound recognizer 77, an operation performer 71, an input receiver 72, a sub controller 73 and a power supply 74. The sound receiver 75, the first sound recognizer 76 and the second sound recognizer 77 shown in FIG. 7 may be configured or function similarly to the sound receiver 21, the first sound recognizer 22 and the second sound recognizer 23 described above with reference to FIG. 2. As shown in FIG. 7, the operation performer 71 may include a signal receiver 711, a signal processor 712, a display 713, a sound output 714, a storage 715, a communicator 717 and a main controller 716. However, the configuration of the display apparatus 7 shown in FIG. 7 is an exemplary embodiment, and may vary as necessary. That is, although it is not illustrated, the configuration of the display apparatus 7 shown in FIG. 7 may exclude at least one of the elements or may include a new additional element.

The signal receiver 711 receives a signal containing at least one from among an image, a sound and a data. The signal receiver 711 includes a tuner and receives a signal such as a broadcasting signal. The tuner may be tuned to one channel selected from among a plurality of channels under control of the main controller 716 and receives a signal of the tuned channel. Here, the channel may be selected by a user. The input receiver 72 may receive a user's input. The input receiver 72 receives a user's input about the selection of the channel and transmits it to the main controller 716. The input receiver 72 includes a control panel provided in the display apparatus 7 to receive a user's input, or includes a remote control signal receiver to receive a remote control signal containing a user's input from a remote controller. Alternatively, the input receiver 72 may include an image receiver such as a camera, and receive an image obtained by photographing a gesture or a similar operation as a user's input. The signal receiver 711 may alternatively receive a signal from an imaging device such as a set-top box, a digital versatile disc (DVD) player, etc. or a user terminal such as a personal computer, etc.

The signal processor 712 performs image processing, sound processing or data processing with regard to the received signal so that an image and/or information can be displayed on the display 713 or a sound can be output through the sound output 714. For example, the signal processor 712 may apply the image processing such as modulation, demodulation, multiplexing, demultiplexing, analog-digital conversion, digital-analog conversion, decoding, encoding, image enhancement, scaling, etc. to the received signal.

The display 713 displays the image and/or information based on the signal processed by the signal processor 712. The display 713 may display an image through various display types such as a liquid crystal display (LCD), a plasma display panel (PDP), an organic light emitting diode (OLED), etc. The sound output 714 may include a loud speaker, and outputs a sound based on a signal processed by the signal processor 712. The storage 715 may be achieved by a non-volatile memory such as a flash memory, a hard disk drive, etc. and stores a program, information and data needed for operating the display apparatus 7. The communicator 717 may communicate with an external device through a wire based or wireless network, and receive and transmit information and/or data required for the operation of the display apparatus 7 and communication between the display apparatus 7 to and from the external device. The communicator 717 may receive a signal containing an image or the like from a server through Internet or a similar network, or receive a signal containing an image or the like from a peripheral such as a laptop personal computer, a smart phone, a smart pad, etc. through a local wireless network. The signal received through the communicator 717 may be processed by the signal processor 712.

The main controller 716 controls the display apparatus 7 to perform operations in accordance with preset information, or in response to a user's command input through the input receiver 72 or the sound receiver 75. For example, the main controller 716 may instruct the signal receiver 711 and the signal processor 712 to display an image based on a signal of a channel selected and tuned to by a user. The main controller 716 may include a control program for performing the instruction, non-volatile and volatile memories in which the whole or part of the control program is stored, and a microprocessor for executing the control program.

The power supply 74 supplies electric power to the sound receiver 75, the first sound recognizer 76, the second sound recognizer 77, the input receiver 72, the sub controller 73 and the operation performer 71 in order to perform the desired operations. The power supply 74 receives an input alternating current (AC) power and outputs a direct current (DC) power having a predetermined level. To this end, the power supply 74 may include an AC-DC converter, a DC-DC converter, etc.

The sub controller 73 assists the main controller 716 to control the display apparatus 7 to perform the desired operations. For example, in the standby mode, the operation performer 71 and the second sound recognizer 77 may be in the power saving mode (or a sleep mode). The sub controller 73 determines whether the occurrence of an event, which occurs during the standby mode, meets a threshold for waking up the operation performer 71, and in fact wakes up the operation performer 71 from the power saving mode to a normal mode, thereby allowing the operation performer 71 or the like to perform the desired operation corresponding to the occurred event. The event occurring in the standby mode may be a sound received through the sound receiver 75. Also, the event occurring in the standby mode may include a user's input received through the input receiver 72. The sub controller 73 may include an operation determiner 732 for determining which operation is to be performed by the operation performer 71 that corresponds to the occurrence of a particular event. Further, the sub controller 73 may include a power controller 731 that controls the power supply 74 to allow or prevent electric power from being supplied to the operation performer 71 or the like.

Figure 8:
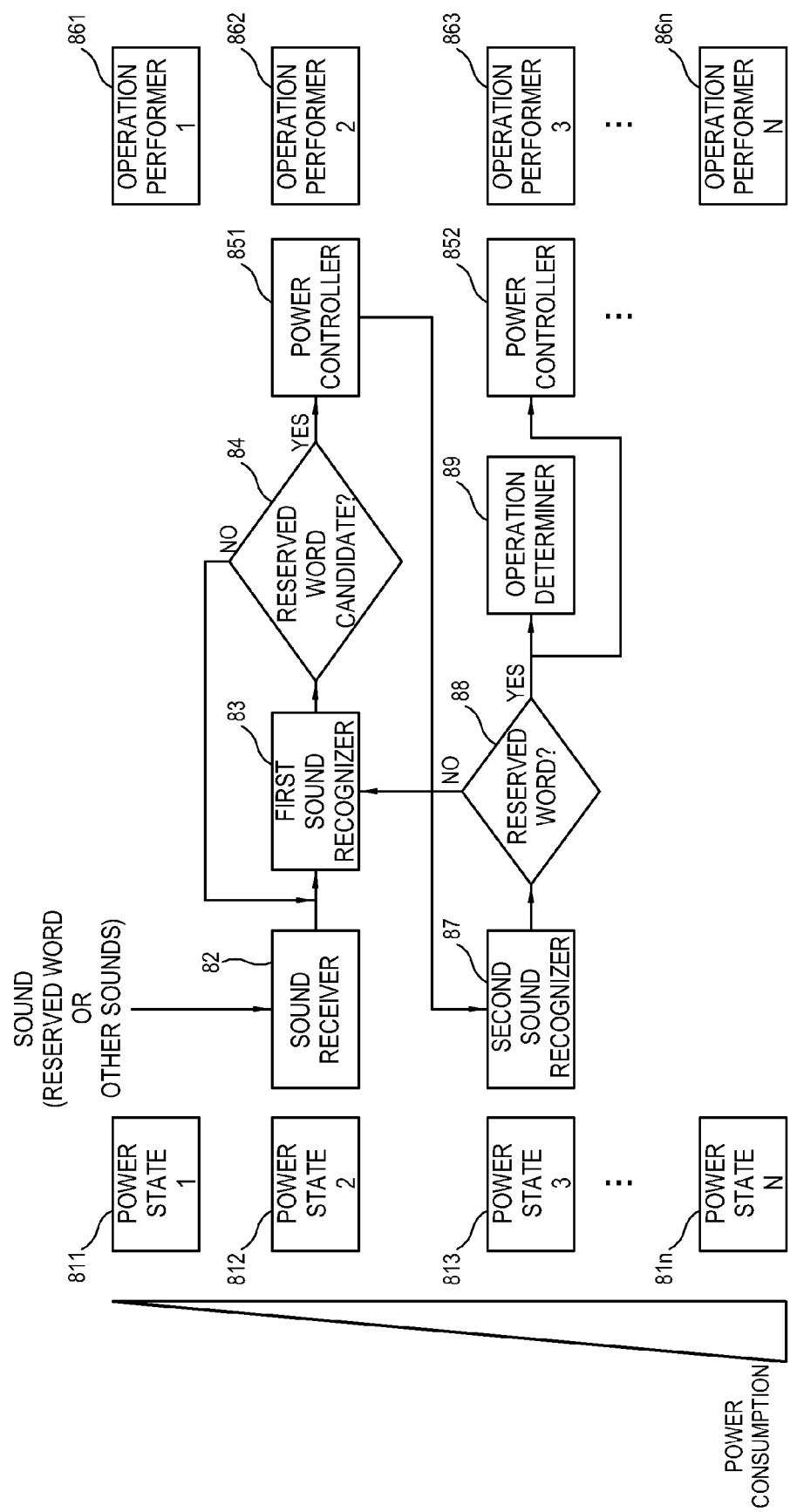
FIG. 8 shows the operation of the display apparatus according to an exemplary embodiment in the standby mode.

FIG. 8 shows operations of the display apparatus 7 according to an exemplary embodiment in the standby mode. The display apparatus 7 shown in FIG. 8 has a series of stepwise power states 811 to 81n. That is, the display apparatus 7 may have a 'power state 1' 811 of the lowest power consumption to a 'power state n' 81n of the highest power consumption. Meanwhile, the operation performer 73 has an 'operation performer 1' 861 to an 'operation performer n' 86n. The 'operation performer 1' 861 to the 'operation performer n' 86n respectively correspond to the signal receiver 711 or the like included in the operation performer 73 as shown in FIG. 7. As the 'operation performer 1' 861 to the 'operation performer n' 86n are sequentially changed from the power saving mode to the normal mode, the 'power state 1' 811 is changed in a stepwise fashion to the 'power state n' 81n.

First, in the standby mode, the second sound recognizer 77 of the 'power state 2' 812 is in the power saving mode. At this time, the sound receiver 75 receives a sound (82). Then, the first sound recognizer 76 determines whether the sound received by the sound receiver 75 is the reserved word candidate (83). The reserved word candidate may correspond to a reserved word 88 for turning on the display apparatus 7, for example, 'Hi, TV, turn on'. If the sound received by the sound receiver 75 is determined as the reserved word candidate 84 ("Yes" of 84), the power controller 731 controls the power supply 74 to change the second sound recognizer 77 from the power saving mode to the normal mode (851). Next, the second sound recognizer 77 determines whether the sound received by the sound receiver 75 is the preset reserved word (88). If the sound received by the sound receiver 75 is determined as the preset reserved word ("Yes" of 88), the operation determiner 732 selects the 'operation performer 3' 863 corresponding to the reserved word (89), and the power controller 731 controls the power supply 74 so that the selected 'operation performer 3' 863 can be woken up from the power saving mode into the normal mode, thereby performing an operation corresponding to the reserved word (852). For example, if the reserved word is 'Hi, TV, turn on', the sub controller 73 controls the main controller 716 or the like to be woken from the power saving mode into the normal mode, and the main controller 716 or the like performs an initial operation so that the display apparatus 7 can be ready to be used by a user.

Alternatively, if the reserved word is 'news briefing,' the sub controller 73 controls the signal receiver 711 or the communicator 717, the signal processor 712 and the sound output 714 besides the main controller 716 to be woken from the power saving mode to the normal mode. The signal receiver 711 or the communicator 717 may receive information about the new briefing from the broadcasting signal or an external server. The signal processor 712 processes the broadcasting signal or the like to acquire the information about the news briefing, and the sound output 714 may output the information about the news briefing. In this case, the display 713 or the like may continuously keep the power saving mode. Alternatively, if the reserved word is 'weather briefing,' in a similar manner to the case of 'news briefing' the corresponding element of the operation performer 71 is woken from the power saving mode to the normal mode, thereby allowing the information about the weather briefing to be output. Alternatively, if the reserved word is 'appointed time,' the information about the appointed time previously set up by a user may be output.

Thus, according to an exemplary embodiment, the display apparatus 7, is configured to control a plurality of elements of the operational performer 71, based on the reserved word 36, which causes some of the plurality of elements to shift from the power saving mode, to be woken up and operate in the normal mode, while allowing other elements to continuously operate in the power saving mode, thereby avoiding excess power consumption.

Figure 9:
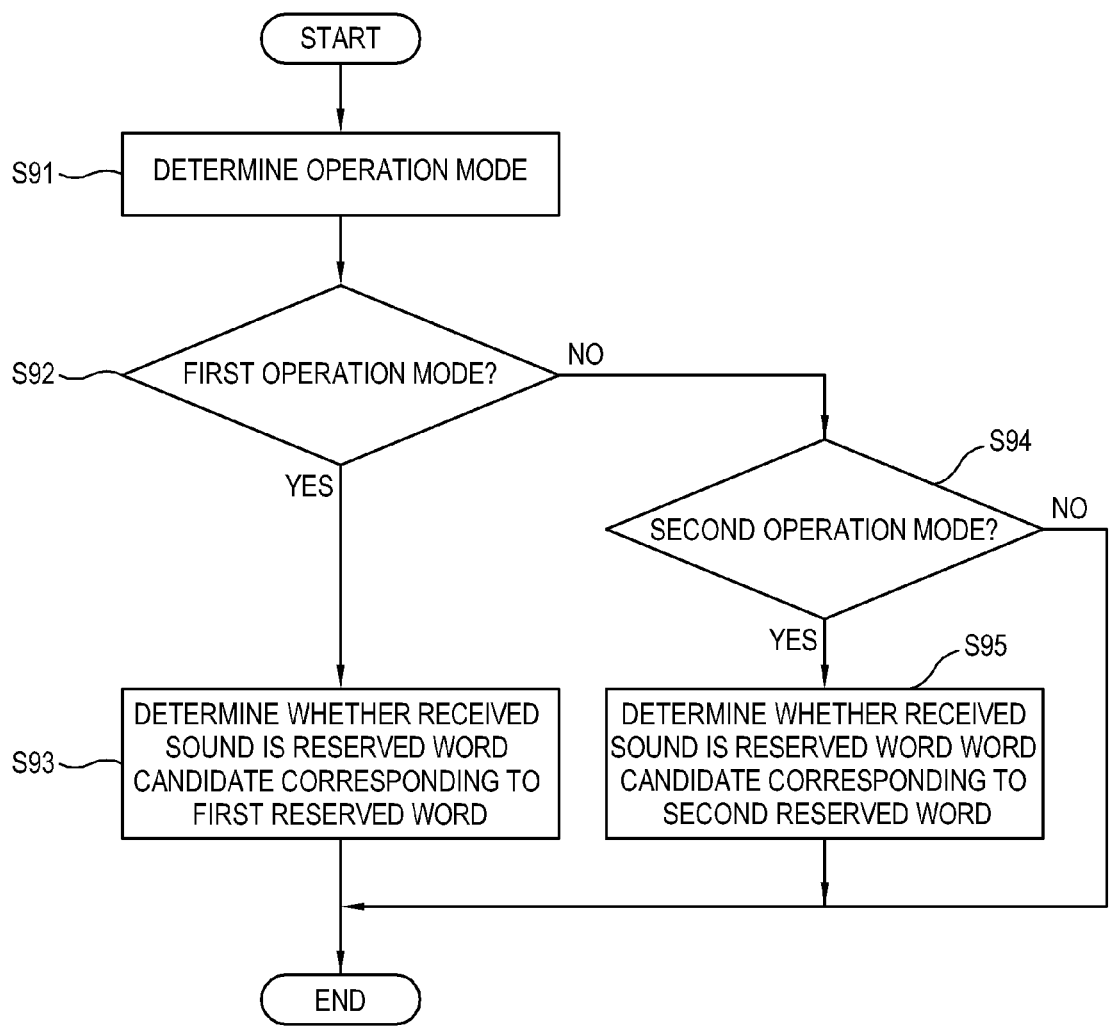
FIG. 9 is a flowchart showing the operation of the display apparatus according to an exemplary embodiment.

The first sound recognizer 76 of the display 7 may perform the sound recognition by changing the reserved word candidate 35 in accordance with current conditions. FIG. 9 is a flowchart showing operations of the display apparatus 7 according to an exemplary embodiment. First, at operation S91, the display apparatus 7 determines the current operation mode. For example, the operation mode includes the standby mode, the normal mode, etc. Next, if the current operation mode corresponds to the first operation mode ("Yes" of S92), at operation S93 the first sound recognizer 76 of the display apparatus 7 determines whether the received sound is the reserved word candidate corresponding to the first reserved word. For example, if the first operation mode is the standby mode, the first sound recognizer 76 determines whether the received sound is the reserved word candidate corresponding to a first reserved word such as 'Hi, TV, turn on.' If the current operation mode does not correspond to the first operation ("NO" at S92), at operation S94 the display apparatus 7 determines whether the current operation mode corresponds to the second operation mode. If the current operation mode corresponds to the second operation ("Yes" at S94), at operation S95 the first sound recognizer 76 determines whether the received sound is the reserved word candidate 35 corresponding to the second reserved word 36. For example, if the second operation is the normal mode, the first sound recognizer 76 determines whether the received sound is the reserved word candidate 35 corresponding to the second reserved word such as 'channel up,' 'channel down,' 'volume up,' and 'volume down.' The number of commands corresponding to the second reserved word may be greater than the number of commands corresponding to the first reserved word 36. That is, in the case of the standby mode or the like, the sound recognition is performed with regard to only a few first reserved words, and the sound having a low probability of corresponding to the first reserved word is filtered out by the first sound recognizer 76, thereby preventing the second sound recognizer 77 or operation performer 71 being in the power saving mode from being woken up unnecessarily. Meanwhile, in the case of the normal mode or the like, the sound recognition is performed with regard to various typically used second reserved words, and the first sound recognizer 76 recognizes the sound having a high probability of corresponding to the second reserved word and smoothly transmits the sound determined as the reserved word candidate 35 to the second sound recognizer 77.

As described above, according to an exemplary embodiment, the operations are performed in response to a user's voice operation in the standby mode while minimizing power consumption.

Also, according to an exemplary embodiment, the operations are performed by recognizing a user's voice with higher reliability while minimizing costs or power consumption.

Although a few exemplary embodiments have been shown and described, it will be appreciated by those with skill and knowledge in the art that changes may be made in these exemplary embodiments without departing from the principles and spirit of the invention, the range of which is defined in the appended claims and their equivalents.

What is claimed is:
1. An electronic apparatus comprising:
a display;
a sound receiver;
a first sound recognizer;
a power supply;
a second sound recognizer; and
a controller configured to:
in a standby mode of the electronic apparatus, control the power supply to supply electric power to the first sound recognizer and not to supply electric power to the second sound recognizer,
based on a sound being received by the sound receiver in the standby mode, control the first sound recognizer to identify whether the received sound is a reserved word candidate, the reserved word candidate being a sound that has a sound characteristic relating to a reserved word,
based on the received sound being identified as the reserved word candidate, control the power supply to supply electric power to the second sound recognizer, and control the second sound recognizer to identify whether the received sound is the reserved word, and
based on the received sound being identified as the reserved word, control a preset operation corresponding to the identified reserved word to be performed.
2. The electronic apparatus according to claim 1, wherein the first sound recognizer identifies whether the received sound is the reserved word candidate based on a similarity between the received sound and the reserved word, and wherein the second sound recognizer identifies whether the received sound is the reserved word based on the similarity between the received sound and the reserved word.

3. The electronic apparatus according to claim 1, wherein the first sound recognizer identifies whether the received sound is the reserved word candidate based on at least one selected from among an energy characteristic, a human sound characteristic and a similarity with the reserved word in accordance with current conditions.

4. The electronic apparatus according to claim 1, wherein the display is not supplied with electric power in the standby mode, and is supplied with electric power based on a sound characteristic of the received sound being identified to correspond to the reserved word.

5. The electronic apparatus according to claim 1, wherein the reserved word comprises a first reserved word and a second reserved word, and the first sound recognizer, based on the electronic apparatus being in the standby mode, identifies whether a sound characteristic of the received sound corresponds to the first reserved word, and identifies whether the sound characteristic of the received sound corresponds to the second reserved word based on the electronic apparatus being in a normal mode.

6. The electronic apparatus according to claim 5, wherein a number of commands corresponding to the second reserved word is larger than a number of commands corresponding to the first reserved word.

7. A method of controlling an electronic apparatus, the method comprising:
controlling a first sound recognizer to be supplied with electric power and controlling a second sound recognizer not to be supplied with electric power in a standby mode of the electronic apparatus,
based on a sound being received in the standby mode, identifying, by the first sound recognizer, whether the received sound is a reserved word candidate, the reserved word candidate being a sound that has a sound characteristic relating to a reserved word,
based on the received sound being identified as the reserved word candidate, controlling the second sound recognizer to be supplied with electric power and identifying, by the second sound recognizer, whether the received sound is the reserved word, and
performing a preset operation corresponding to the identified reserved word based on the received sound being identified as the reserved word.

8. The method according to claim 7, wherein the identifying whether the received sound is the reserved word candidate is performed based on a similarity between the received sound and the reserved word, and
wherein the second sound recognizer identifies whether the received sound is the reserved word based on the similarity between the received sound and the reserved word.

9. The method according to claim 7, wherein the identifying whether the received sound is the reserved word candidate is performed based on at least one selected from among an energy characteristic, a human sound characteristic and a similarity with the reserved word in accordance with current conditions.

10. The method according to claim 7, further comprising:
supplying no electric power to an operation performer that performs an operation corresponding to the reserved word in the standby mode, and supplying the electric power to the operation performer based on a sound characteristic of the received sound being identified to correspond to the reserved word.

11. The method according to claim 7, wherein the reserved word further comprises a first reserved word and a second reserved word, and the identifying whether the received sound is the reserved word candidate comprises:
identifying whether a sound characteristic of the received sound corresponds to the first reserved word in the standby mode; and identifying whether the sound characteristic of the received sound corresponds to the second reserved word based on the electronic apparatus being in a normal mode.

12. The method according to claim 11, wherein a number of commands corresponding to the second reserved word is larger than a number of commands corresponding to the first reserved word.

13. An electronic apparatus comprising:
a sound receiver;
a power supply;
a first sound recognizer;
a second sound recognizer; and
a controller configured to:
in a standby mode of the electronic apparatus, control the power supply to supply electric power to the first sound recognizer and not to supply electric power to the second sound recognizer,
based on a sound being received by the sound receiver in the standby mode, control the first sound recognizer to identify whether the received sound is a reserved word candidate, the reserved word candidate being a sound that has a sound characteristic relating to a reserved word,
based on the received sound being identified as the reserved word candidate, control the power supply to supply electric power to the second sound recognizer, and control the second sound recognizer to identify whether the received sound is the reserved word,
based on the received sound being identified as the reserved word, control a preset operation corresponding to the identified reserved word to be performed, and
wherein the first sound recognizer that identifies whether the received sound is the reserved word candidate consumes less electric power than the second sound recognizer that identifies whether the received sound is the reserved word.

14. An electronic apparatus comprising:
a display;
a sound receiver, wherein the electronic apparatus identifies a current operation mode;
a power supply;
a first sound recognizer;
a second sound recognizer; and
a controller configured to:
control the power supply to supply electric power to the first sound recognizer in a power saving mode, and control, based on a sound being received by the sound receiver in the power saving mode, the first sound recognizer to identify whether the received sound is a reserved word candidate, the reserved word candidate being a sound that has a sound characteristic relating to a reserved word,
control, based on the received sound being identified as the reserved word candidate, the power supply to supply electric power to the second sound recognizer to identify whether the received sound is the reserved word, wherein based on the current operation mode corresponding to a first operation mode, the first sound recognizer identifies whether the received sound corresponds to a first reserved word, wherein based on the current operation mode corresponding to a second operation mode, the first sound recognizer identifies whether the received sound corresponds to a second reserved word, wherein a number of commands corresponding to the second reserved word is greater than a number of commands corresponding to the first reserved word, and wherein the controller is configured to control a preset operation corresponding to the identified reserved word to be performed based on the received sound being identified as the first or second reserved word.

* * * * *